United States Patent Office.

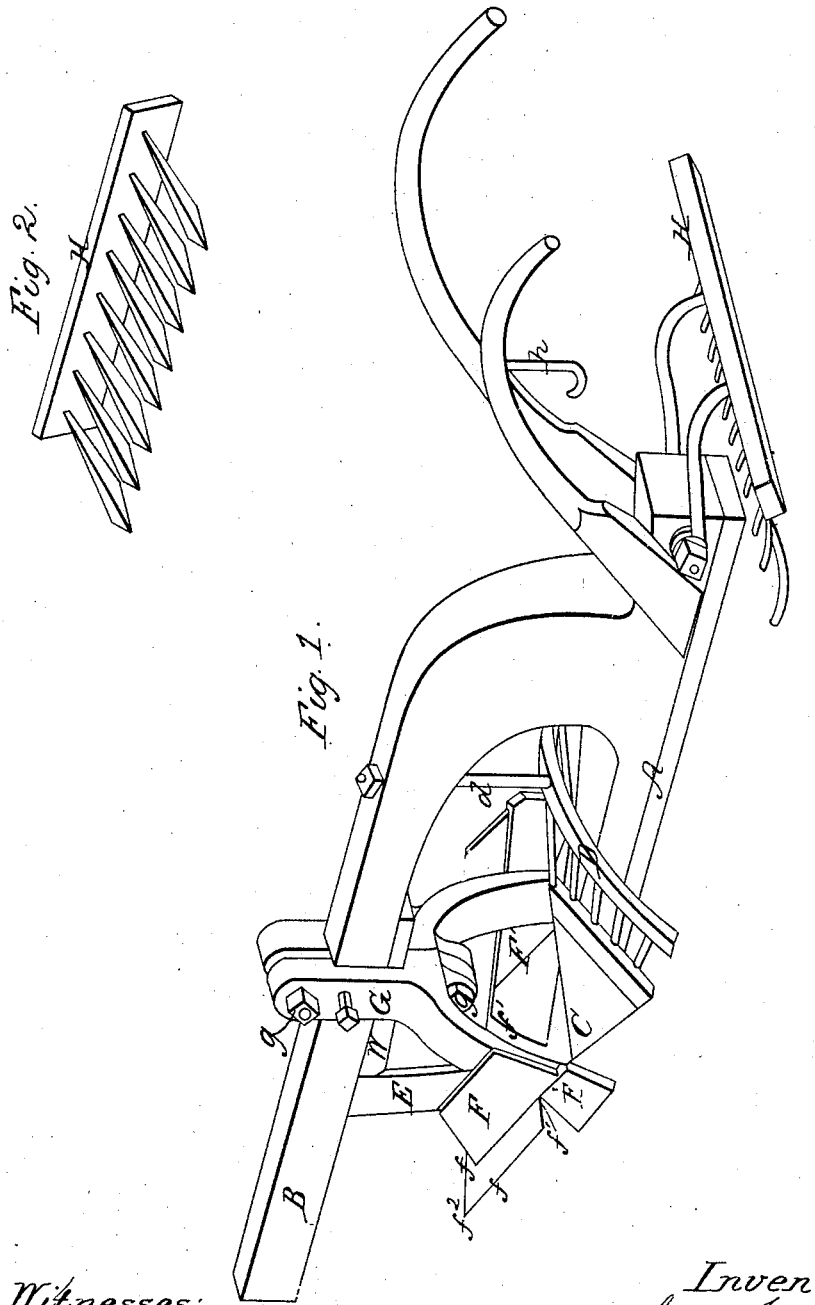

LEWIS FINCH, OF VIENNA, VIRGINIA.

Letters Patent No. 76,427, dated April 7, 1868.

IMPROVEMENT IN POTATO-DIGGERS.

*The Schedule referred to in these Letters Patent and making part of the same.*

TO ALL WHOM IT MAY CONCERN:

Be it known that I, LEWIS FINCH, of Vienna, in the county of Fairfax, and State of Virginia, have invented a new and useful Improvement in Potato-Diggers; and I do hereby declare the following to be a full, clear, and exact description of the same, reference being had to the accompanying drawings, which are made part of this specification.

Figure 1 is a perspective view of the machine, with a portion of the mould-board broken away.

Figure 2 is a perspective view of a rake of modified form, which will be hereinafter described.

The subject of my invention is a machine, adapted to unearth potatoes, separate them from the earth and tops, and leave them in rows on the ground, in convenient condition for gathering up.

In the drawing, B represents a beam, connected to an iron-shod frame or sheth, A, which is armed in front with a share, C, adapted to penetrate the ground to a sufficient depth, to work beneath all the potatoes, and raise them to the surface. Extending backward, from the rear edge of the share C, is a screen, D, formed of bars $d\,d$, and attached by a rod, $d'$, to the beam, or in any other suitable manner. E is a coulter, projecting downward from the beam B. F F represent a pair of mould-boards, diverging backward, and formed in front with horizontal cutting-edges $f f$ at a proper height to cut the potato-tops or vines, and remove the bulk of the earth from above the potatoes without disturbing the latter. The cutters $f f$ may be formed in one piece, meeting in acute angle at $f^2$. The mould-boards F are provided with downwardly-projecting wings F', which may extend nearly as low as the share C, but are far enough asunder to pass on each side of the row of potatoes, and are formed in front with cutting-edges $f^1 f^1$, their office being, as they precede the share, to remove the earth and vines from the sides of the row as the horizontal cutters $f f$ have removed them from the top. The entire mould-board structure F F', $f f^1$, $f^2$ may be secured to the beam by a strong hanger or bracket, G, arranged in any suitable manner to admitt of vertical adjustment to regulate the depth at which the cutters $f f$ will work. This vertical adjustment may be provided for either by making the brackets in two parts, notched on their inner faces, to fit over teeth or flanges on the beam, and clamping it to the beam by screw-bolts $g\,g$, both above and below, or by a single bolt passing through a vertical slot in the beam, or the bracket may be made in one piece, with a vertically-elongated mortise or slot, and adjusted by wedges W, which may be inserted either above or below the beam, or both. A portion of the near side of the mould-boards is omitted in the drawing to exhibit the share.

In operation, the vines are cut away by the edges $f f^1$, and most of the earth removed from the potatoes. The potatoes are unearthed by the share C, and shaken loose from the earth by the screen. A rake, H, following, completes the separation of the potatoes from the earth, and leaves them exposed in a row upon the surface of the ground, in convenient position for gathering. $h$ is a hook, employed to support the rake H, when not in use.

Fig. 2 represents a modification in the form of the rake, the teeth being made as those of a cultivator, wide below, and with narrow necks, between which the potatoes may pass. A suitable spring may be employed to hold the rake down to its work if necessary.

Having thus described my invention, the following is what I claim as new therein, and desire to secure by Letters Patent:

1. The double mould-board F, adjustable on the beam B, and provided with horizontal and vertical cutting-edges, as shown and described, and for the purposes specified.

2. The combined arrangement of the double mould-board F F', convex share C, and screen D, all constructed and operating as and for the purposes specified.

3. In combination with the above, I further claim the pivoted rake H, for finally separating the potatoes from the earth as described.

To the above specification of my potato-digger, I have signed my hand, this 14th day of January, A. D. 1868.

LEWIS FINCH.

Witnesses:
OCTAVIUS KNIGHT,
J. E. M. BOWEN.